United States Patent [19]

King

[11] 3,970,479
[45] July 20, 1976

[54] ELECTROCHEMICAL CELL
[75] Inventor: Wendell L. King, Isanti, Minn.
[73] Assignee: Medtronic, Inc., Minneapolis, Minn.
[22] Filed: Mar. 12, 1975
[21] Appl. No.: 557,754

Related U.S. Application Data
[63] Continuation-in-part of Ser. No. 485,960, July 5, 1974, abandoned.

[52] U.S. Cl. .............................. 136/133; 136/107; 136/135 R; 136/178
[51] Int. Cl.² ...................................... H01M 2/04
[58] Field of Search ........... 136/133, 177, 178, 135, 136/107

[56] References Cited
UNITED STATES PATENTS
3,506,495   4/1970   Reilly et al. ..................... 136/133 X Primary Examiner—John H. Mack
Assistant Examiner—C. F. Lefevour
Attorney, Agent, or Firm—Schroeder Siegfried Ryan & Vidas

[57] ABSTRACT

An electrochemical cell in which the sealing material between the electrodes of the cell is impervious to liquid but permeable to hydrogen gas. The improvement in the cell construction is a shortened path through the sealing material to permit a continual and gradual discharge of the hydrogen gas generated in the cell and prevent a buildup of gas therein. The shortened path is affected by openings in the inner terminal member associated with the sealing material.

8 Claims, 3 Drawing Figures

ELECTROCHEMICAL CELL

This application is a continuation-in-part application of my prior application Ser. No. 485,960, filed July 5, 1974, in the United States Patent Office.

My invention relates to electrochemical cells and more particularly to an improved electrochemical cell which includes a means for preventing a buildup of excess internal gas pressure within the cell.

Electrochemical cell constructions take a variety of forms. Where such cells are constructed to be sealed or liquid tight to prevent possibility of escape of electrolyte, they have also included the provision for venting the cell upon the presence of an excess of pressure within the cell to prevent the explosion of rupturing the cell. However, such construction provides for a release of gas generated within the cell only upon a predetermined or maximum pressure buildup and the release of the gas take place rapidly or instantaneously. Generally, this is accomplished by deformation of part of the cell construction which returns to its normal configuration when the equilibrium pressure is obtained within the cell. An example of such construction is shown in the patent to F. D. Williams U.S. Pat. No. 2,712,565, dated July 5, 1955, and entitled ELECTROCHEMICAL CELL. When such cell constructions are used in connection with implantable medical devices, and they are associated with other equipment and encapsulated or where they serve merely as an encapsulated power source, the aspect of the design which permits the rapid expulsion of the gas upon pressure buildup presents an undesirable situation with respect to the encapsulation. Normally, the encapsulant or at least a portion of the construction associated with the cells, is made of gas permeable material so as to be able to absorb and/or release gradually the gas generated from the cell. However, the construction is such that it is unable to absorb or release the rapid discharge or venting of gas from the cell. This creates an excessive buildup of pressure within the device and subjects the same to cracking or rupture.

In the present invention, an improved cell construction is provided in which the cell is suitably sealed to prevent the escape of electrolyte and the sealant is made of a material which is permeable to hydrogen gas generated within the cell. The design of the electrode terminals and the cell construction itself is such as to provide a leakage path for the hydrogen generated within the cell without a pressure buildup so that the release of hydrogen gas from the cell is gradual so as to create no excessive gas pressure within a device within which it is associated as in an implantable medical device. Thus, as will be taught in the present invention, the cup design or a terminal of the cell is modified to provide a shortened path for hydrogen gas through the sealant material which is permeable to the hydrogen gas thereby preventing a buildup of pressure within the cell.

It is therefore an object of this invention to provide an improved cell construction having good venting characteristics to gas generated therein.

Another object of this invention is to provide an improved electrochemical cell construction which retains its characteristics to gas generated therein.

Another object of this invention is to provide an improved electrochemical cell construction which retains its characteristics as a sealed device to prevent the escape of electrolyte and because of the venting characteristics, it is particularly suitable for use in an implantable electrical device.

These and other objects of the present invention will become apparent from the reading of the attached description together with the drawings wherein.

Figure 1:
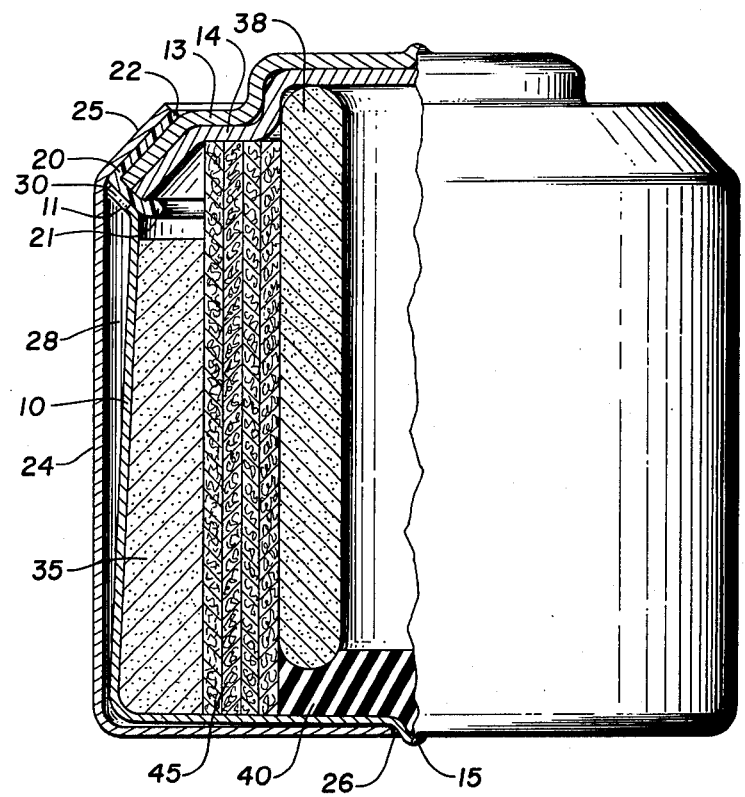
FIG. 1 is a view of an electrochemical cell in vertical partial section embodying our invention.

Electrochemical cells through normal power generation will generate hydrogen gas therein. Gas generation will be variable and sometimes excessive due to impurities in battery materials and momentary shorting of the cells caused by handling or jarring. Where such cells are to be incapsulated, the problem involved in such gas generation and the release of the same sometimes becomes critical. Thus, most electrochemical cells do not vent hydrogen gas at a uniform rate. In some cases, the normal cell vent does not function at all causing excessive internal pressure and fracturing of the cell case. In other cases, the vent releases hydrogen gas in spurts similar to safety valve. Such a rapid release of gas becomes critical when the cell is encapsulated and the encapsulant is incapable of passing such large volumes of gas. This variable in hydrogen gas venting behavior is generally considered the reason for the variation in electrochemical cell gasing rates under identical conditions and primarily contributes to the problem of encapsulation of such cells.

Where electrochemical cells are to be encapsulated, a buildup in the pressure in the epoxy encapsulant can be reduced if the cells are vented at a very uniform rate. The hydrogen gas generated therein can be made to permeate through the epoxy encapsulant at a rate linear with time and therefore, uniform venting of the hydrogen gas from the cell, would reduce the maximum pressure applied to the encapsulant.

Such uniform venting of the electrochemical cell can be accomplished by removing a portion of the metal from one of the electrodes or cans forming the enclosure of the cell in the area of neoprene seal to allow the hydrogen gas to permeate through the neoprene seal of the cell. The hydrogen permeation coefficient of the neoprene material which is most uniformly used in the sealing of electrochemical cells is given in the literature as:

$$Q = \frac{10 \times 10^{-8} \text{ cm}^2}{\text{sec atm}} \text{ at } 25°C$$

This resolves to:

$$Q = \frac{141 \text{ cm}^3 \text{ mil}}{(\text{in}^2)(\text{atm})(\text{day})}.$$

This figure is approximately 100 times greater than the similar coefficient of hydrogen permeation for the epoxy encapsulation materials. Using the hydrogen gas permeation coefficient of the neoprene material, the average thickness of a neoprene seal in an electrochemical cell, and a maximum gasing rate for an electrochemical cell under adverse conditions, the surface area of the neoprene seal required to permeate a given amount of hydrogen gas can thus be calculated. Thus, an area of the metal can, normally positioned adjacent and in sealing relationship with the neoprene seal, can then be removed to expose the neoprene as a passage to permeate the hydrogen gas. Using 0.015 cc of hydrogen gas per day at a 1 atmosphere of pressure differential as a normal condition or average load condition gasing rate of an electrochemical cell and a 17 mill thickness of neoprene as an average thickness of seal in an electrochemical cell, the surface area of neoprene to provide a sufficient area of permeation of hydrogen gas of 0.015 cc per day from a cell can be calculated. Thus, using the equation:

$$A = \frac{ql}{Q\,pt}$$

where "$q$" is the gasing rate desired to protect against; "$l$" is the length of path through the neoprene seal to obtain the desired permeation; "$Q$" is the permeation coefficient of hydrogen gas through neoprene at a desired pressure differential ($p$) for a given period of time ($t$).

$$A = \frac{.015\ cc \times 17\ (mil)\ (in^2)\ (atm)\ (day)}{141\ cc^3\ 1\ (atm)\ 1(day)\ 1(mil)} = .00182\ in^2$$

Thus, by removing sufficient area of metal can adjacent the neoprene seal, a uniform permeation rate of 0.015 cc of hydrogen per day at a 1 atm differential can be obtained.

Figure 2:
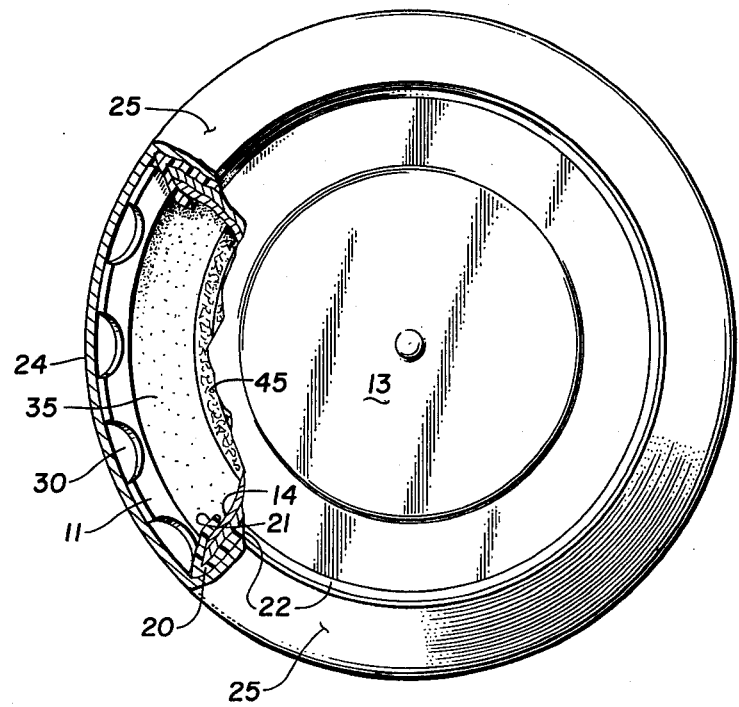
FIG. 2 is a plan view of the cell of FIG. 1 with parts broken away.

Referring to the drawings of FIGS. 1 and 2, there is shown a typical electrochemical cell of the type shown in the referenced patent to F. D. Williams U.S. Pat. No. 2,712,565. It will be understood, that in the electrochemical cells of this type, the actual shape of the parts may vary. In the drawings, reference numeral 10 denotes the inner casing or can of steel which is generally cup shaped in form having straight or inwardly sloping walls and an outwardly flared lip 11 at the open upper edge of the same. The bottom of the cup shaped casing has a dimple or depression 15 at the center of the same, for purposes to be later noted. The cup shaped member 10 forms one terminal of the cell with the opposite terminal being defined by a pair of disc shaped members 13 and 14 which are meant to nest together at the center of the same with the outer edges being disposed from one another to provide a spacing between the disc shaped terminal members at the outer edge of the same. These members or metal plates are made of a material to provide a good permanent electrical contact with each other and to circuit components attached to the exposed upper plate 13. Positioned between these electrode terminal members 10, 13, and 14, is an annular sealing member 20 which is preferably made of a synthetic elastomer, such as neoprene. The sealing member includes a body portion 21 which is positioned between the flared lip 11 of the can or terminal 10 and the outer edges of the disc shaped terminal members 13 and 14. Positioned over the inner cup shaped terminal member is an outer can or cover member 24 which encircles the inner can and has straight outwardly sloped side walls with an inwardly flared upper lip 25. This can has an opening in the center of the bottom, as indicated at 26, which cooperates with the dimple 15 or depression in the bottom of the inner can to perform a valving action, as will be hereinafter defined. The lip 25 bears against the sleeve portion 22 of the sealing member 20 urging the same against the disc shaped members 13 and 14 and clamping the disc shaped members 13 and 14 with the body portions 21 of the sealing member to the inner can 10 to provide the sealed relationship between the terminal members. Such a construction is similar to the prior art as set forth in the Williams patent referred to above. With the sealing member providing a liquid-tight seal between the disc shaped members preventing the escape of electrolyte, (to be hereinafter identified) from the cell. The spacing between the disc shaped mambers 13 and 14 at the edges thereof provides a trap for any electrolyte that might escape beyond the inner disc shaped member 14 and the spacing 28 between the inner terminal can 10 and the outer cover member 24 provides a passage for electrolyte and/or hydrogen gas generated within the cell.

In the present invention, as specifically set forth in FIG. 2, the lop 11 has a series of openings or notches 30 distributed about the periphery of the same. The total area of the openings will be of a size sufficient to create an area of exposure of the neoprene seal to provide a path for permeation of the hydrogen gas through the seal to use a quantity of gas estimated at a maximum of generation under severe load conditions of the cell. The interior of the cell may take varying forms and the cathode electrode will preferably be a sleeve type member 35 made of a mixture of mecuric oxide with graphite which is press fitted within the inner surface of the terminal 10. The opposite electrode or anode is in the form of a cylindrical cylinder or sleeve 38 which will preferably be made of an amalgamated sinc powder which is positioned concentric with the disc shaped electrode 14. Suitable insulator and spacer member 40 is positioned beneath the same to separate the anode from the terminal 10, the spacer being a synthetic elastomer such as neoprene. Positioned between the anode and cathode is the electrolyte which is preferably formed in the cylinder 45 and in the form of a plurality of layers of a paper-like material saturated with the electrolyte which may basically be an alkaline metal hydroxide.

The sealing member 20 which is made preferably of a neoprene will provide a sealed and liquid-tight insulating boundary between the terminals of the cell. The neoprene is permeable to hydrogen gas whcih may be generated within the cell due to impurities therein. Distinguishing over the prior construction, the apertures or recesses 30 in the lip 11 of the inner terminal shorten the path of gas flow through the neoprene or body portion of the sealer member so as not to permit a buildup of gas within the cell. Thus, as gas is generated, it will be permeated through the neoprene sealing member and allowed to enter the space 28 between the inner electrode terminal and the outer protective can 24 wherein it will follow the outer can to the valve type opening formed by the depression 15 and aperture 26 respectively to be released from the cell. The shortened path provides for a equilibrium pressure in the cell and prevents a sharp discharge of gas therefrom making it compatable with an implantable device wherein the cell would normally be encapsulated by gas impervious material. The gradual release will also enable the construction of an encapsulated device to absorb the gradual release of gas without a buildup of internal pressure within the device.

Figure 3:
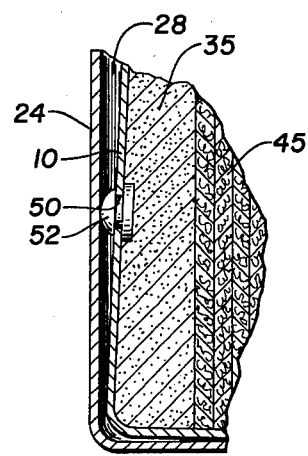
FIG. 3 is a vertical sectional of the electrochemical cell embodying an alternate embodiment of the invention.

As an alternate embodiment of the invention, the same terminal 10 construction and outer protective can 24 as found in the embodiments of FIGS. 1 and 2 with the exception that the recesses or notches 30 are removed therefrom. The path for the release of gas is obtained by an aperture 50 or apertures positioned in the wall of the inner terminal member as indicated in FIG. 3, this aperture or apertures having associated therewith a neoprene grommet or sealing member 52 which seals the same in a liquid-tight manner. The apertures, like the recesses 30 or openings in the lip, provides a shortened path and area of exposure of this neoprene seal through the wall of the inner terminal and through the neoprene sealing material to permit the gradual discharge of hydrogen gas generated within the cell and prevent a buildup of pressure within the same.

While I have specified certain materials to be incorporated within the cells, it would be recognized that variations may be made thereto within the scope of the present invention.

What I claim is:

1. An electrochemical cell comprising an inner cup shaped electrode terminal having side walls and an upper lip, a disc shaped electrode terminal, sealing means being made of a liquid impervious and gas permeable material positioned in part between the cup shaped terminal and the disc shaped terminal separating the same in an insulating manner from one another, said sealing means including a body portion and sleeve portion with the body portion positioned between the upper lip and side walls, an outer cup shaped cover member fitted over the inner cup shaped electrode terminal and having a lip bearing against the sleeve portion of the sealing member and clamping the disc shaped terminal and the inner cup shaped terminal together in an assembled and sealed relationship, and an opening in said inner cup shaped electrode terminal extending to the atmosphere and covered by said sealing means having a surface area sufficient to provide a shortened path for hydrogen gas generated by the cell under the most severe load conditions of the cell through the sealing member from the interior of the cell.

2. The electrochemical cell of claim 1 in which the disc shaped electro terminal includes a pair of disc shaped members nested together in a contacted relationship at the center thereof with the edges of the members bearing against the body portion of the sealing member.

3. The electrochemical cell of claim 2 in which the body portion of the sealing member provides a sealing surface between the separated edges of the pair of disc shaped terminal members.

4. The electrochemical cell of claim 1 in which the openings in the inner terminal cup shaped terminals are notches in the flared lip thereof.

5. The electrochemical cell of claim 1 in which the opening in the electrode cup shaped terminal are a plurality of holes therein covered by the body portion of the sealing member.

6. The electrochemical cell of claim 1 in which the outer cup shaped cover member has an aperture in the bottom thereof remote from an upper flared lip cooperating with the inner cup shaped electrode terminal to define a passage for hydrogen gas vented from the cell.

7. The electrochemical cell of claim 3 in which the sleeve portion of the sealing member forms a liquid-tight seal between the outer cover member and the disc shaped electro terminal members and in which the spacing at the edges therebetween provides a trap for electrolyte leakage.

8. An electrochemical cell comprising, an inner cup shaped electrode terminal having inwardly sloped walls and an outwardly flared upper lip, a disc shaped electrode terminal having an edge, an annular sealing member being made of a liquid impervious and hydrogen gas permeable material positioned between the inner cup shaped terminal and the disc shaped terminal member separating the same in an insulating manner from one another, said sealing member having a body portion and a sleeve portion with the body portion positioned between a flared upper lip of the inner cup shaped terminal and the edge of the disc shaped terminal, an outer cup shaped cover member having an upper, inwardly extending flared lip and outwardly sloped side walls, said outer cup shaped cover member being fitted over the inner cup shaped electrode terminal with the inwardly flared lip thereof bearing against the sleeve portion of the sealing member and clamping the disc shaped terminal and inner cup shaped terminal together in an assembled and sealed relationship, and openings in the flared lip of the inner cup shaped terminal to provide a shortened path for the flow of hydrogen gas through the sealing member from the interior of the cell to the spacing between the inner cup shaped terminal and the outer shaped cover member defined by the oppositely sloped walls thereof, said cell containing electrode materials common only to the respective terminal with an electrolyte material positioned therebetween.

* * * * *